Dec. 22, 1953

L. IVERSEN 2,663,784

MEANS AND METHOD OF MAKING METAL STRIP

Filed Sept. 23, 1950

INVENTOR
Lorenz Iversen
By his attorneys
Hoopes, Leonard & Glenn

Dec. 22, 1953

L. IVERSEN 2,663,784

MEANS AND METHOD OF MAKING METAL STRIP

Filed Sept. 23, 1950

INVENTOR
Lorenz Iversen
By his attorneys
Hoopes, Leonard & Glenn

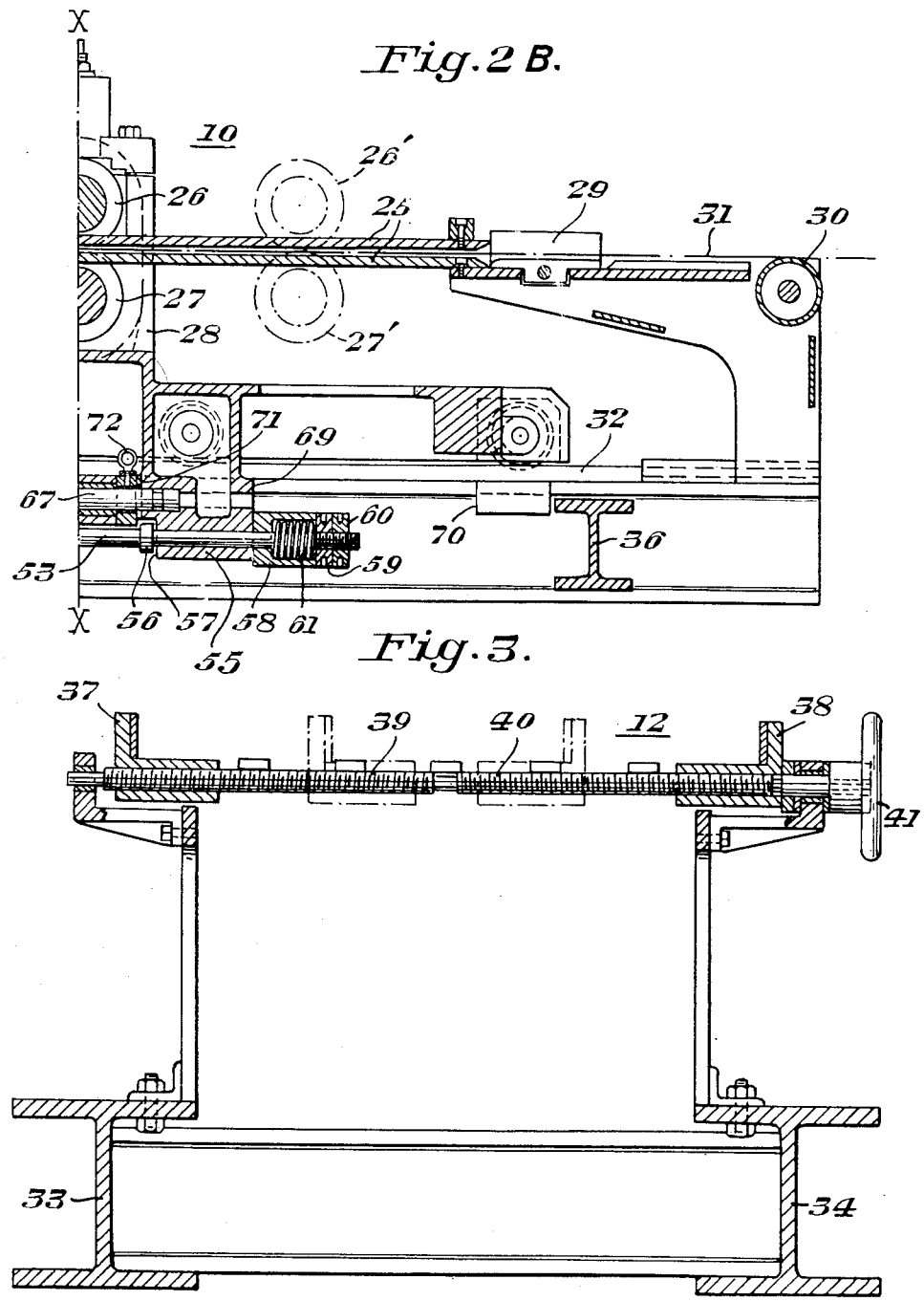

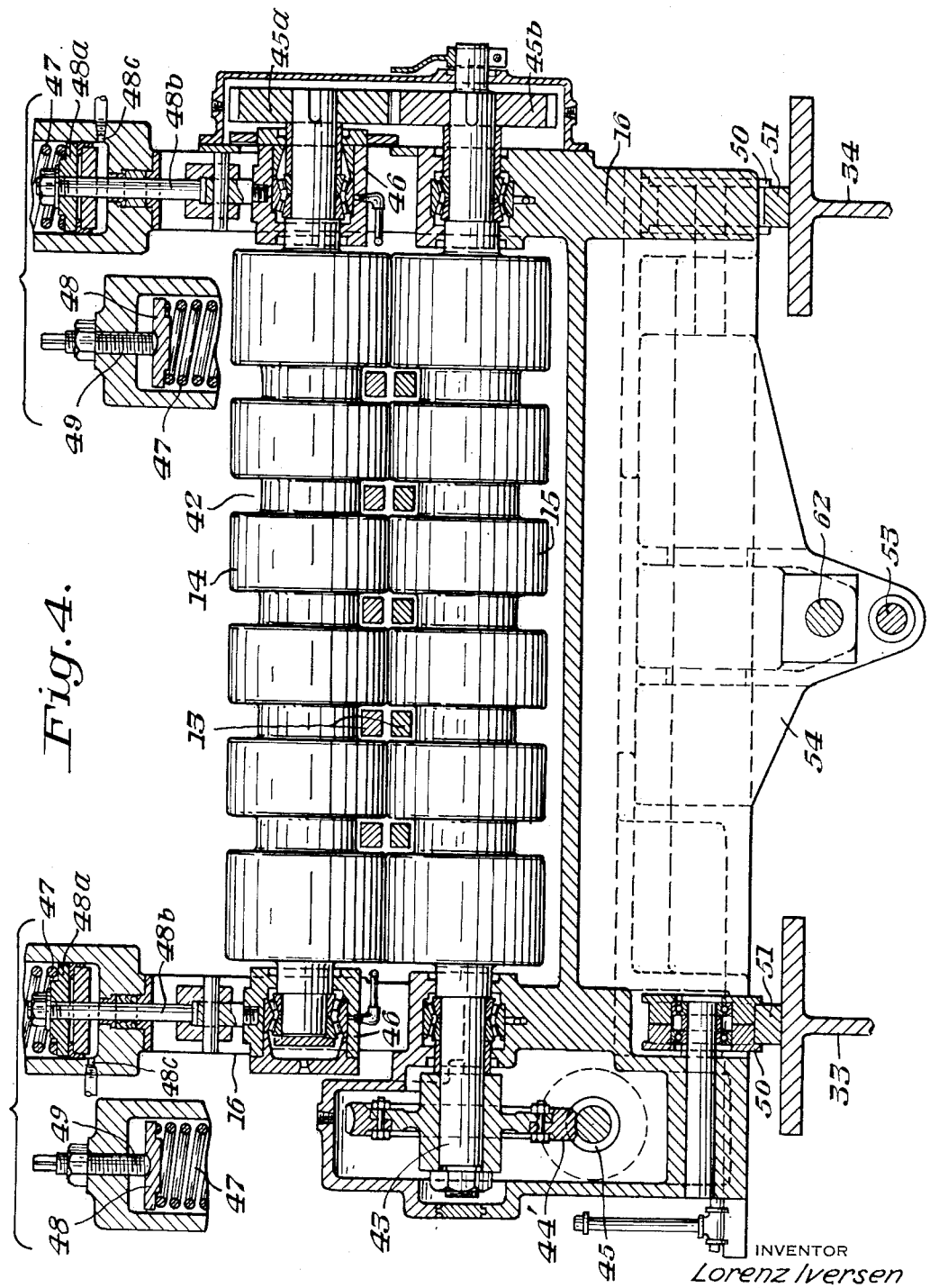

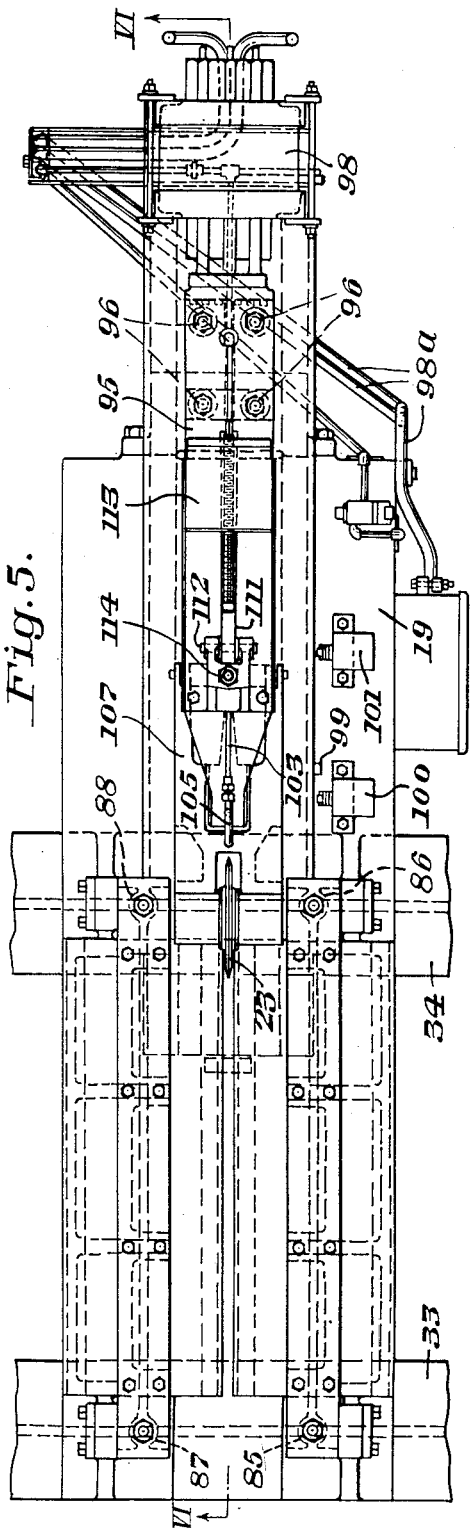

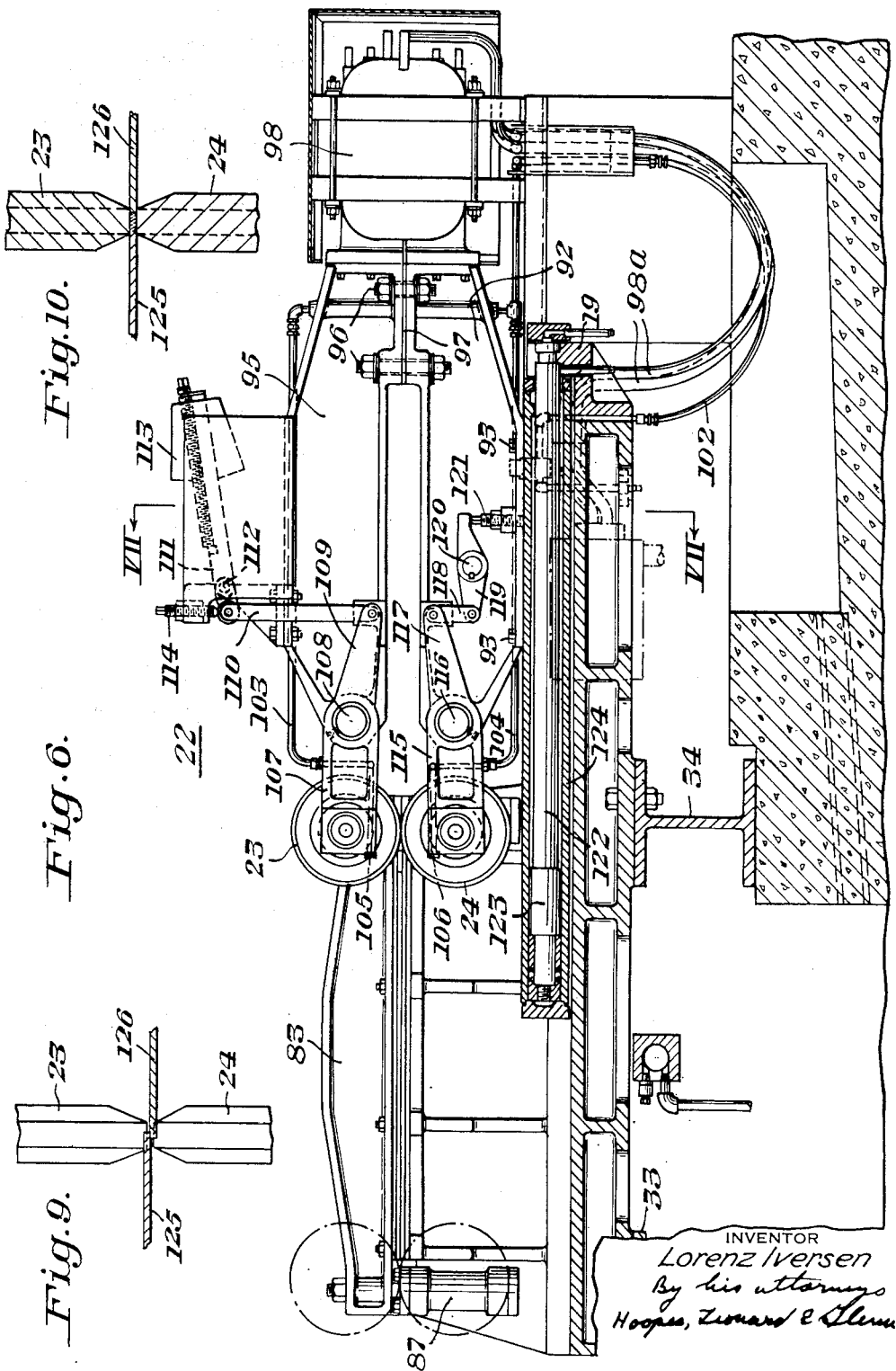

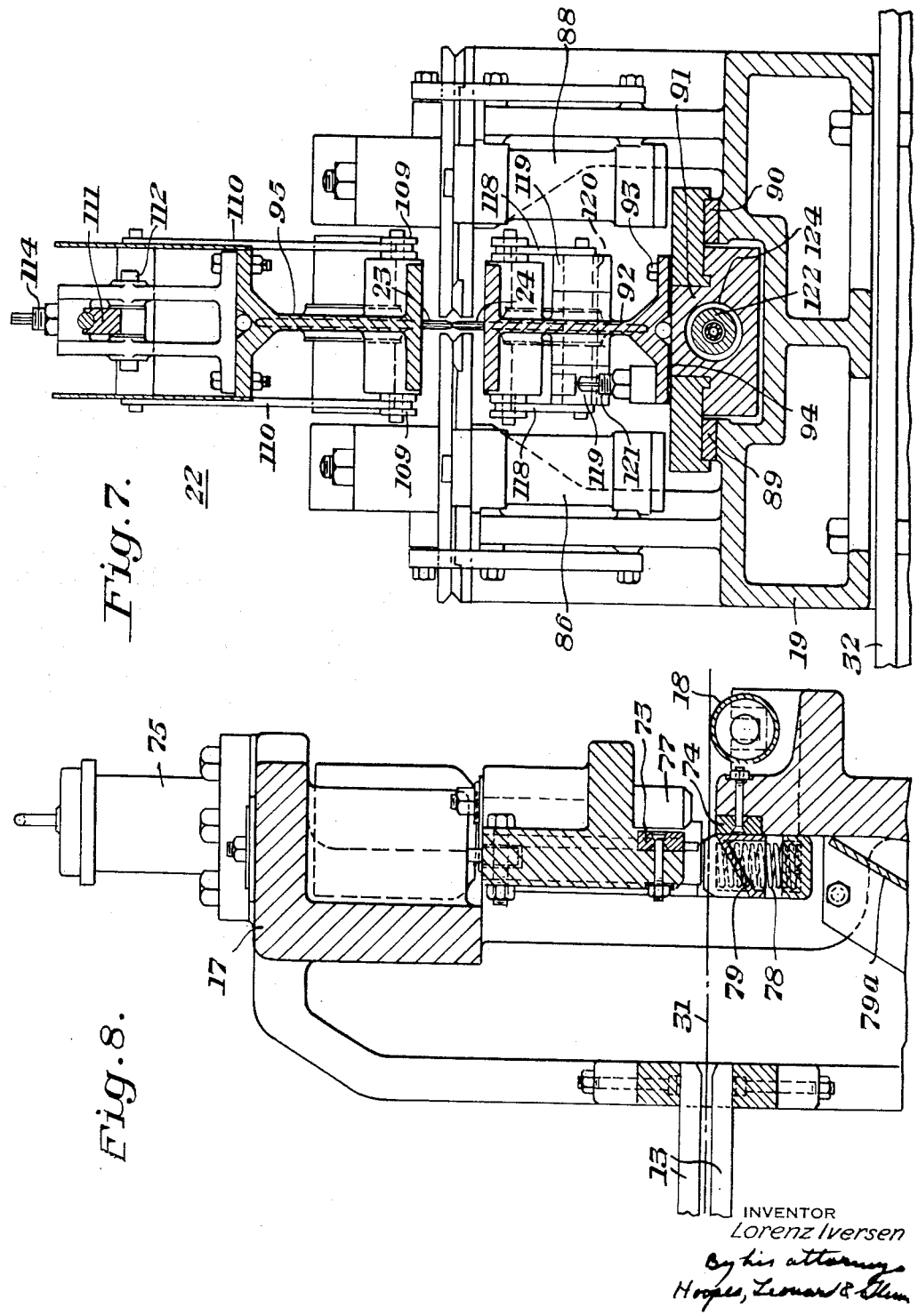

Patented Dec. 22, 1953

2,663,784

UNITED STATES PATENT OFFICE 2,663,784

MEANS AND METHOD OF MAKING METAL STRIP

Lorenz Iversen, Pittsburgh, Pa., assignor to Mesta Machine Company, Pittsburgh, Pa., a corporation of Pennsylvania Application September 23, 1950, Serial No. 186,456

14 Claims. (Cl. 219—10)

This invention relates to means and method of making a continuous metal strip from a plurality of shorter strips by shearing adjacent ends of the shorter strips and welding them together in overlapping relationship in such a manner that the welded joints are substantially the same in smoothness and thickness as the intermediate portions of the component strips.

Conventional welded strip end joints are thicker than the adjacent unwelded portions of the strips and tend to injure processing equipment through which the welded strips may subsequently be passed. This difficulty is obviated in the case of relatively thick pieces by butt welding them and then trimming the welded joints. Such butt welding has also been used in the case of relatively thin metal strips (cf. Biggert et al. Patent No. 2,078,365), but the resultant welded joint is thicker and less smooth than the adjacent unwelded portions of the joined strips, and cannot be trimmed without danger of tearing one of the strips adjacent the weld. The other conventional way of joining overlapping strip ends is by spot welding them in overlapping relation, but this likewise produces a joint which is thicker than the adjacent strip sections and is unsuitable for trimming.

In accordance with my invention a smooth and thin-sectioned welded joint between metal strip ends is achieved by shearing adjacent strip ends, moving them into slightly overlapping relationship, and clamping them in this position while moving a pair of welding rollers along the overlapping ends and simultaneously pressing the rollers together to mash the welded joint and thereby reduce its thickness and smooth its exposed surfaces. As a result there is no need for any subsequent trimming or smoothing of the welded joint. Speed in completing the whole operation is desirable to reduce the amount of advance slack which must be accumulated in order to allow the advance sections of the strip to continue moving through processing equipment while a new strip section is being welded onto the trailing end of the continuous strip. Accordingly, I provide for rapidly transferring the sheared strip ends to the welder and positioning them quickly and accurately in predetermined overlapping relation for welding. The welding wheels, moreover, move with great rapidity and after each welding operation remain on one side of the continuous strip and pass back again during the next welding operation. Accurate positioning of the overlapping sheared strip ends is particularly necessary because the speed of the welding operation and the nature of the welded joint both depend upon having a small amount of overlap of the strip ends, which should be between $\frac{1}{64}$ and $\frac{1}{32}$ of an inch. An overlap of less than $\frac{1}{64}$ results in a weak weld and of more than $\frac{1}{32}$ results in a weld thicker than the adjacent unwelded portions of the strip ends.

Other objects, details and advantages of the invention will become apparent from the following description and in the accompanying drawings. In the accompanying drawings we have shown a present preferred embodiment of the invention and have illustrated a present preferred method of practicing the same, in which Figures 1A and 1B are continuous plan views of strip end joining apparatus in accordance with the invention;

Figures 2A and 2B are continuous sectional views taken on the line II—II in Figures 1A and 1B;

Figure 2C is an enlarged view of a portion of Figure 2B;

Figure 3 is a sectional view of one of the strip edge guides, taken on the line III—III in Figure 2A, with the adjacent parts omitted;

Figure 4 is a sectional view taken on the line IV—IV in Figure 2A, showing one of the pinch roll stands;

Figure 5 is an enlarged plan view of the welding unit, with the other parts broken away;

Figure 6 is a sectional view taken on the line VI—VI in Figure 5;

Figure 7 is a sectional view of the welding unit taken on the line VII—VII in Figure 6;

Figure 8 is an enlarged view of the section of the shearing unit shown in Figure 2A, with the other parts removed;

Figure 9 is an enlarged sectional view along the center line of two overlapped strip ends in position for welding, with approaching welding wheels shown broken away; and Figure 10 is a sectional view corresponding to Figure 8, with the welding wheels fusing the strip ends.

Figure 1A:
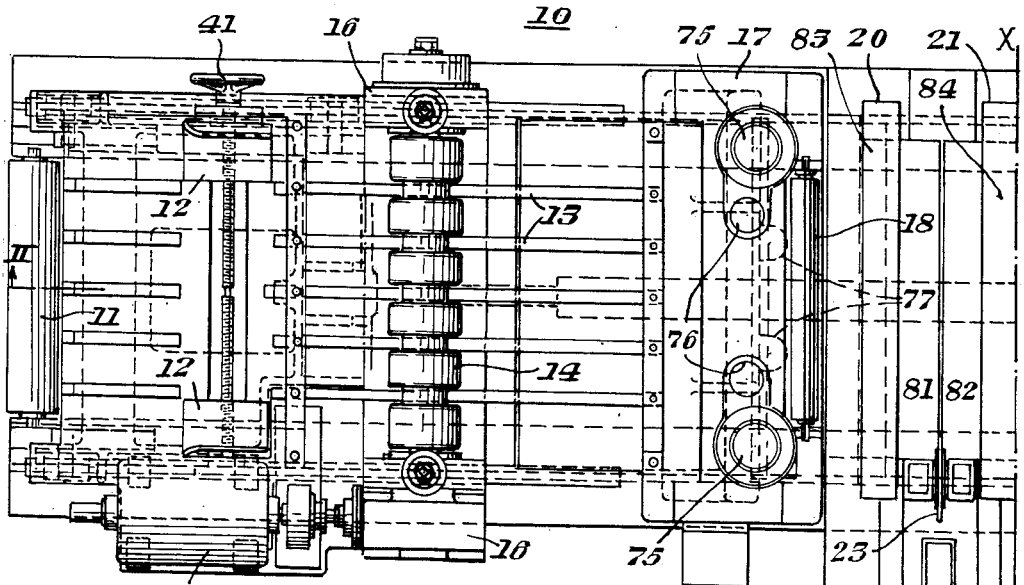
Figure 1B:
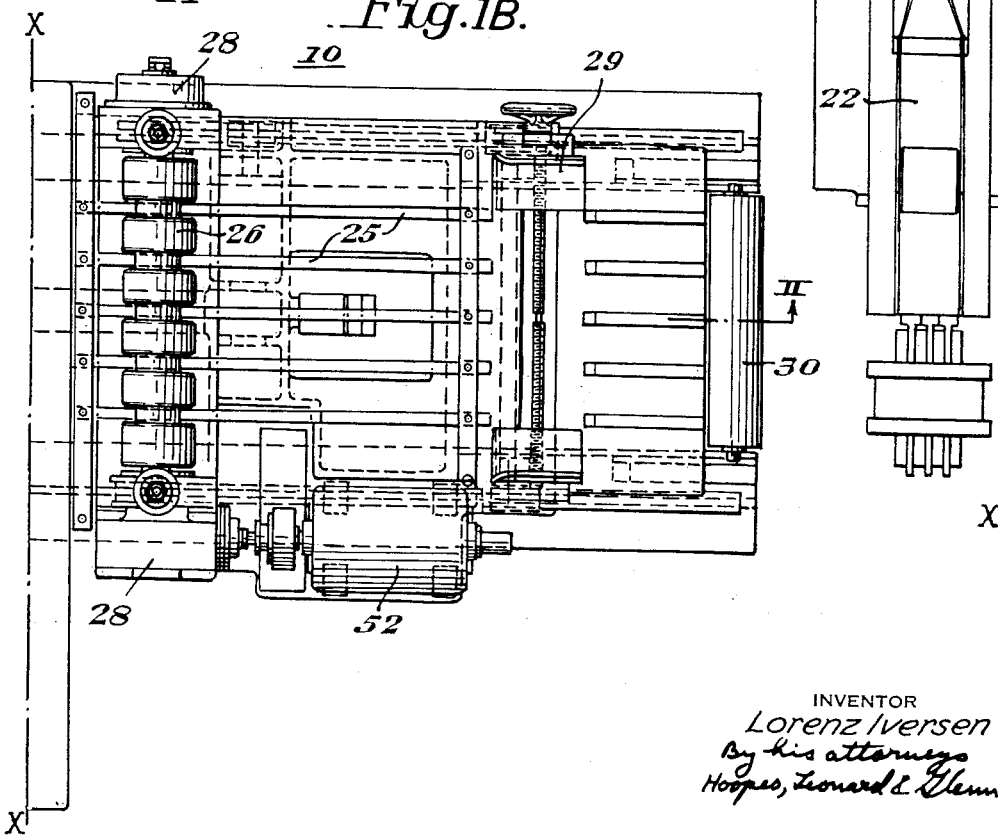

Referring now more particularly to the drawings, the continuous strip forming apparatus 10 shown in Figures 1A, 1B, 2A and 2B comprises, starting from the left in these figures, an idler roller 11, a strip edge guide 12, carrier bars 13 extending between entry pinch rolls 14 and 15 in a housing 16, a shearing stand 17 with a strip-supporting idler roller 18 mounted thereon, a welding unit stand 19 mounting two pairs of clamps 20 and 21 with a welding head 22 adapted to move a pair of welding wheels 23 and 24 between the two sets of clamps. A second set of carrier bars 25 extending between delivery pinch rolls 26 and 27 mounted in a housing 28, a second strip edge guide 29, and a strip supporting idler roller 30 shown at the extreme right end of Figures 1B and 2B. The entire mechanism is adapted to be used in conjunction with a pair of strip coilers on either side or at the entry end of a line of equipment for processing continuous strip. While an unbroken section of continuous strip is moving through the illustrated mechanism the idler rollers 11, 18 and 30 turn freely, the pinch rolls 14, 15, 26 and 27 drive, and the clamps 20 and 21 are disengaged so that the strip moves through the mechanism along a normal pass-line indicated generally at 31, extending between the carrier bars 13 and 25 and between the upper and lower elements of the clamps 20 and 21.

Figure 2A:
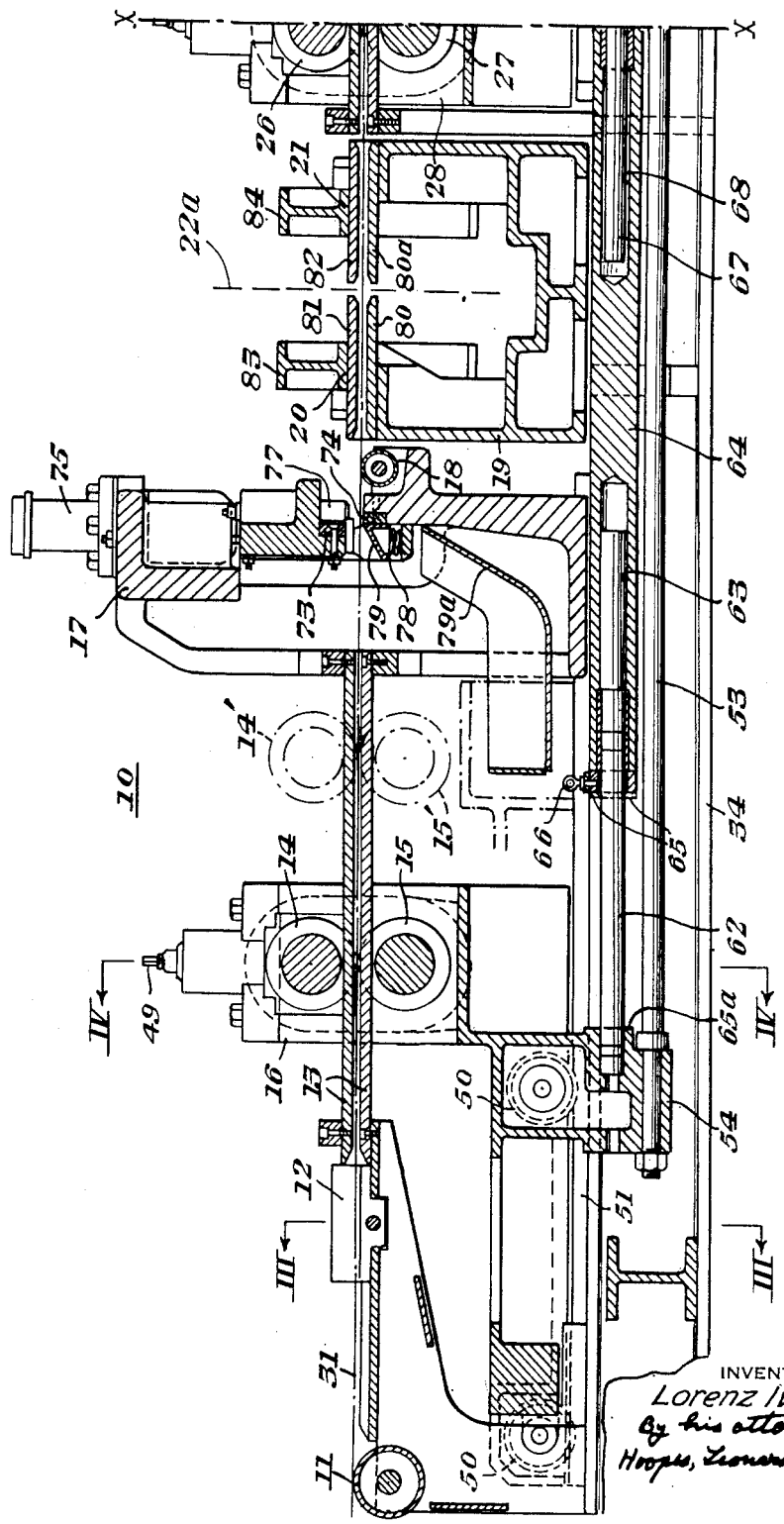

The units of the apparatus 10 are carried on a base 32 comprising a pair of longitudinal beams 33 and 34 and a pair of cross beams 35 and 36 secured between the beams 33 and 34 (Figures 2A, 2B and 3). The idler rollers 11 and 30 are journaled in fixed relation to the base 32, and the strip edge guides 12 and 29 are likewise mounted on stands secured to the base 32. The guides 12 and 29 each comprise vertical guiding elements 37 and 38 movable toward and from each other by oppositely threaded screw elements 39 and 40 journaled in fixed supports and rotatable by hand wheels 41 to adjust the edge guiding elements for various widths of strip, as illustrated in Figure 3 for the guide 12.

The pinch roll housings 16 and 28 are mounted on the base 32 for movement parallel to the pass-line 31 through the apparatus 10. As shown in Figure 4, the pinch rolls 14 and 15 are generally in the form of cylinders rolling substantially tangentially together at the pass-line with grooves 42 in the rolls to receive the carrier bars 13. The lower roll 15 is journaled in fixed supports in the housing 16 and has an integral neck 43 mounting a worm wheel 44' by which the roll 15 is driven by a motor 44 (Figure 1A) through a worm 45 (Figure 4). The upper roll 14 is driven from the shaft of roll 15 through spur gears 45a and 45b. The upper roller 14 is journaled in bearing boxes 46 mounted for vertical sliding movement in the housing 16 and urged downwardly by springs 47 extending between upper spring caps 48 adjustable in the housing 16 by means of bolts 49, and lower spring caps 48a secured to the bearing boxes 46 by rods 48b. The caps 48a act as pistons in enclosed spaces therebelow which are connected through ports 48c with a source of compressed air for releasably lifting the caps 48a and roll 14. The weight of the housing 16 is carried by double-flanged rollers 50 rolling on tracks 51 secured to and extending along the longitudinal base beams 33 and 34. The motor 44 is secured to an extension of the frame of the housing 16 and moves with the housing 16 along the beams 33 and 34 on the rollers 50. The housing 28 is constructed in the same way as the housing 16 and rolls on extensions of the same tracks 51 on the beams 33 and 34. The pinch rolls 26 and 27 are driven by a motor 52 mounted on and carried with the housing 28. The motors 44 and 52 are both mill-type electric motors having brakes which lock the motor shafts whenever the motors are not running.

The roll housings 16 and 28 are connected together by a tie rod 53 having one end bolted in fixed relation to a lower extension 54 of the housing 16 disposed between the base beams 33 and 34 (Figure 4), and extending slidably through a similar lower extension 55 of the roll housing 28. An integral flange 56 on the tie rod 53 adjacent an abutment 57 on the extension 55 serves to limit movement of the housings 16 and 28 toward each other. The tie rod 53 projects through the extension 55 and a cup 58 is slidably mounted thereon between the extension 55 and a pair of lock nuts 59 and 60 secured to the end of the rod 53. A compression spring 61 between the base of the cup 58 and the nut 59 urges the cup 58 against the extension 55 and thereby acts on the tie rod 53 to urge the housing 16 toward the housing 28 until the tie rod flange 56 engages the abutment 57 of the housing 28.

A plunger 62 is secured at one end to the lower extension 54 of the roll housing 16 and projects at its other end into an actuating cylinder 63 in a stationary mounting 64 on the base 32. When the roll housing 16 moves toward the shearing stand 17 the plunger 62 retracts in the cylinder 63 until a spacer 65 is engaged between an abutment 65a on the moving lower housing extension 54 and the stationary projecting end of the cylinder 63. The spacer 65 is in the form of an inverted U secured to a lift ring 66 having a dependent projection adapted to fit into a recess in the top of the projecting end of the cylinder 63, so that the spacer 65 is supported to extend around the plunger 62 without sliding against it and thereby scoring its surface. The limit of movement of the roll housing 16 toward the shearing stand 17 is illustrated by the dotted circles 14' and 15' showing the extreme position of the pinch rolls 14 and 15 adjacent the shearing stand 17.

A plunger 67 is secured at one end to the lower extension 55 of the roll housing 28 and at its other end extends into an actuating cylinder 68 in the fixed mounting 64. The cylinder 68 has fluid inlet and outlet conduits connected to its extreme inner end and when fluid under pressure is supplied to the cylinder 68 to actuate the plunger 67 the roll housing 28 is thereby moved in a direction away from the shearing stand 17 until an abutment 69 on the lower extension 55 of the housing engages a fixed stop 70 secured to the base 32. When this occurs the pinch rolls 26 and 27 are in the position shown in dotted lines at 26' and 27'. When fluid under pressure is supplied to the cylinder 63 to actuate the plunger 62 so that the roll housing 16, tie rod 53 and roll housing 28 are drawn back toward the entry idler roller 11, the roll housing 28 continues to move in this direction until a spacer 71 is pressed between the projecting end of the cylinder 68 and an opposite abutting face of the lower extension 55 of the roll housing 28. The spacer 71 is in the form of an inverted U secured to a lift ring 72 and is removably supported on the end of the cylinder 68 (Figure 2C) in the same manner as described above. After the return movement of the roll housing 28 is stopped by the spacer 71 the continued movement of the roll housing 16 in the same direction is opposed only by the resilient action of the spring 61 until the nut 59 engages the adjacent end of the cup 58 and thereby locks the tie rod 53 and hence the roll housing 16 to the roll housing 28 so that further movement of the roll housing 16 in the direction of the entry idler roll 11 is halted. The amount of this overrun of the roll housing 16 is preferably in the order of ¼ inch and is provided by spacing the nut 59 by such a distance from the end of the cup 58 when the tie rod flange 56 and the base of the cup 58 are both in engagement with the lower extension 55 of the roller housing 28.

The plungers 62 and 67 each have a conduit connected to a suitable source of compressed fluid (not shown). A common switch valve is preferably connected to the two conduits so that when fluid is supplied to one of the cylinders the other is permitted to exhaust, and so that when the valve is in neutral position the conduits of both cylinders are locked against escape of fluid therefrom. In this way the plunger 62 is locked in full extended position against the action of the spring 61 with the nut 59 engaging the cup 58 when the roll housing 16 is returned to its ready position nearest the delivery idler roller 11 (in the position shown in full lines in Figure 2A). The shearing stand 17 has a pair of horizontal cutting blades 73 and 74 adapted to cut a strip or a pair of overlapping strip ends at right angles to their line of travel and across their widths. The upper blade 73 is actuated by a pair of rams 75 (Figure 1A) against the action of a pair of springs 76 for returning the blade 73 to its raised position. A pair of spring-pressed holddown rods 77 are mounted on the frame which supports the upper blade 73 and move up and down with the blade 73 in order to hold the strips beneath the blade during the cutting operation. The lower blade 74 is secured in a fixed frame having a flat upper surface level with the upper edge of the blade 74 and adapted to cooperate with the hold-down rods 77 during the cutting operation. A spring-mounted stripper 78 extends along the side of the blade 74 beneath the upper blade 73 and is restrained against movement above the level of the blade 74. When the upper blade 73 moves down during the cutting operation the stripper 78 yields resiliently. When a pair of strips are cut the incoming leading end is preferably placed over the outgoing trailing end so that the severed portion of the trailing end can fall down along an inclined face 79 of the stripper 78 into a suitable trough 79a. The severed end of the incoming leading strip end is then removed by hand after the blade 73 and the hold-down rods 77 have returned to their raised position. The lower blade 74 and stripper 78 are positioned substantially below the pass-line 31 and the nearby supporting idler roller 18 is mounted tangential to the pass-line 31 in order to hold the trailing strip end higher than the following strip end after the shearing operation. This difference in level is important for causing the ends to overlap and not abut each other when the roll housing 16 is moved toward roll housing 29 preparatory to transferring the trimmed ends to the welder.

The clamps 20 and 21 mounted on the welding stand 19 comprise a pair of spaced lower clamping plates 80 and 80a fixed to the welding stand 19 and a pair of upper clamping plates 81 and 82 secured to beams 83 and 84. A pair of actuating units 85 and 86 each comprising a hydraulic ram and opposed spring are connected to the opposite ends of the beam 83 so that the springs bias the clamping plate 81 up and the rams move it down, and a like pair of actuating units 87 and 88 are connected to the opposite ends of the beam 84 for moving the clamping plate 82 up and down. The conduits of all of the rams of the units 85—88 are connected to a common source of fluid under pressure and discharge reservoir with a single control valve (not shown).

A welding head 22 (Figures 1A, 5 and 7) is mounted on the welding stand 19 for movement across the path of strip through the clamps 20 and 21 at right angles to the line of movement of the strip and exactly parallel to the blades 73 and 74 of the shearing stand 17 (the vertical central plane of movement of the welding wheels 23 and 24 is indicated by the dotted line 22a in Figure 2A). A pair of bronze bearing strips 89 and 90 are secured to the frame 19 and slidably support the travelling base 91 of the welding head 22. A lower welding head frame 92 is bolted at 93 to the base 91 and is electrically insulated therefrom by insulation 94. An upper welding head frame 95 is bolted at 96 to the lower frame 92 and is electrically insulated therefrom by insulation 97. The upper welding wheel 23 is mounted on the upper frame 95, the lower welding wheel 24 is mounted on the lower frame 92, and a transformer 98 is mounted on the frames 92 and 95 with one of its poles electrically connected to the welding wheel 23 and the other pole electrically connected to the welding wheel 24 in order to pass a low voltage, high amperage welding current between the wheels 23 and 24 through the frames 92 and 95 and the connecting wheel mountings. Flexible cables 98a supply electric power to the transformer 98. A pin 99 (Figure 5) on the travelling base 91 engages spaced limit switches 100 and 101 on the stationary frame 19 to turn the welding current on and then off as the rollers 23 and 24 begin and end their pass across a pair of overlapping strip ends. In order to cool the welding wheels, which are preferably of bronze, a flexible water supply line 102 is connected to flexible hoses 103 and 104 with nozzles 105 and 106 disposed adjacent the welding wheels 23 and 24 and directed to spray water toward the points of welding contact of the said wheels. The wheel 23 is carried between brackets 107 pivoted on a fixed stud 108 secured to the frame 95. The brackets 107 have a rear extension 109 connected through a link 110 with a lever 111 pivoted on a stud 112 extending from the frame 95. A counterweight 113 is mounted on the opposite end of the lever 111 and is adjustable therealong to vary the downward pressure applied to the welding wheel 23 by the counterweight 113 through the connecting linkage just described. Downward movement of the welding wheel 23 is limited by an adjusting screw 114 threaded in the frame 95 and abutting the end of the lever 111 connected to the link 110. The welding wheel 24 is similarly carried between a pair of brackets 115 pivoted on a stud 116 projecting from the frame 92. A rear extension 117 of the brackets 115 is connected through a link 118 to one end of a lever 119 pivoted on a stud 120 projecting from the frame 92. The other end of the lever 119 abuts an adjusting screw 121 threaded in the frame 92. The screw 121 acts through the linkage just described to support the welding wheel 24 and to adjust its vertical position.

The welding wheels 23 and 24 are moved across the width of the strip ends to be welded (see full line and dotted line positions of the welding wheels in Figure 6) by a double-acting hydraulic unit comprising a fixed ram 122 having one end secured to the stationary base 19 and its other end mounting a double-acting piston 123, and a cylinder 124 integral with the travelling base 91 and slidably enclosing the piston 123. Both ends of the cylinder 124 are closed, one of them being in sliding sealed engagement with the ram 122, and the spaces in the cylinder 124 on opposite sides of the piston 122 are alternately supplied with actuating fluid under pressure through suitable conduits opening thereinto and extending through the interior of the ram 122 in order to shift the cylinder 124 and hence the welding head 22 back and forth to perform successive welding operations. The welding operation is illustrated in Figure 9, where a pair of overlapped strip ends 125 (leading) and 126 (trailing) are shown in section before being welded, and in Figure 10, where the same sectioned portions of the strip ends 125 and 126 are shown being fused together between the welding wheels 23 and 24.

The preferred operation of the whole apparatus 10 is outlined as follows:

When the trailing end of a metal strip passing through the apparatus reaches the entry carrier bars 13 the pinch rolls 14, 15, 26 and 27 are slowed down and the delivery pinch rolls 26 and 27 are stopped and thereby locked against rotation just before the said trailing end passes between the shearing blades 73 and 74. The leading end of another metal strip is then drawn over the entry idler roller 11 and is passed between the entry carrier bars 13 and the entry pinch rolls 14 and 15 which are then operated to advance the leading end just beyond the shearing blades 73 and 74. The leading end automatically slides over the trailing strip end between the shearing blades. The entry pinch rolls 14 and 15 are then stopped and thereby locked against rotation, and the rams 75 are actuated to cause the shearing blade 73 to move down and shear the pair of overlapping strip ends positioned below it. The severed end of the trailing strip end drops downwardly from the sloping face of the stripper 79 and the severed end of the leading strip end is removed manually. The trimmed ends are parallel with each other as a result of being cut together and the trimmed trailing end is held by the idler 18 slightly above the other trimmed trailing end resting on the stripper 79. During these operations both of the pinch roll housings 16 and 28 are in their extreme positions toward the entry end of the apparatus 10 (shown in full lines in Figures 2A and 2B). The fluid locked in the cylinder 63 is then released so that the spring 61 moves the tie rod 53 until its flange 56 engages the abutment 57 of the lower extension 55 of the pinch roll housing 28, thereby moving the pinch roll housing 16 a small predetermined distance, preferably in the order of ¼ of an inch, toward the shearing stand 17. This causes the trimmed leading strip end to underlap the trailing trimmed strip end by ¼ of an inch in the shearing stand 17, and fluid is then (or simultaneously) supplied under pressure to the cylinder 68 to move the pinch roll housing 28 with the leading strip end locked between the pinch rolls 26 and 27 until the fixed stop 70 stops this movement. In the meanwhile the compression spring 61, which has initially expanded to cause the described ¼ inch overlap of the strip ends in the shearing stand 17, acts through the tie rod 53 to draw the pinch roll housing 16 with the pinch roll housing 28 so that the ¼ inch overlap is maintained while the overlapping strip ends pass from the shearing stand 17 through the welding clamps 20. The pinch roll housing 16 is halted by the spacer 65 and the compression spring 61 deflects to permit the slight additional movement of the pinch roll housing 28 until it is halted by the fixed stop 70. The fluid in the cylinder 68 is locked when the pinch roll housing 28 reaches the stop 70 in order to halt it there against the action of the spring 61. This movement of the pinch roll housing 28 after movement of the pinch roll housing 16 has ceased reduces the overlap between the strip ends by a predetermined amount calculated to leave the strip ends in very slight overlapping relation directly between the path of the contacting surfaces of the welding wheels 23 and 24 (Figure 9). For example, when welding 21-gauge low carbon steel strip an overlap of 1/64 of an inch gives very satisfactory results with welding wheels having ¼ inch tread travelling at a rate of 35 feet per minute with a pressure of 800 pounds between the wheels and using a welding current of 14,000 amps. at 13.3 volts.

After the pinch roll housings 16 and 28 have completed their movement to position the strip ends in the desired overlapping relationship for welding the rams 85—88 are operated to close the welding clamps 20 and 21 to secure the strip ends in the slightly overlapping relation determined by the positions of the pinch roll housings 16 and 28, and the ram cylinder 122 is then supplied with fluid under pressure at one end or the other, depending upon the position of the welding head 22 at the beginning of the welding operation, to draw the welding wheels 23 and 24 across the clamped overlapping strip ends. As soon as the welding wheels first contact the strip ends the welding current is turned on and kept on continuously while the welding wheels move across the full width of the overlapping strips to complete the welded joint. During this welding operation water is supplied through the nozzles 105 and 106 to cool the welding wheels and thereby prevent them from reaching temperatures which would injure their welding surfaces. A predetermined pressure between the welding wheels is maintained during the welding operation by the counterweight 113. During the welding operation the current between the welding wheels heats the overlapping strip ends until they fuse and at the same time the pressure between the wheels plus the greater width of the wheels than the amount of overlap of the strip ends causes the wheels to roll and mash down the momentarily soft fused metal at each portion of the joint so that the completed joint is of substantially the same thickness and surface smoothness as the unwelded strip portions on each side thereof (Figure 10). The strip ends ordinarily have some variation of cross-sectional thickness transversely across the strip, and the welding wheels are able to follow the resultant cambered profile of the overlapped strip ends while maintaining a constant pressure through the action of the pivotal, weighted mounting of the welding wheels. As a result, there is no need for any subsequent trimming or grinding operation along the welded joint to prevent injury to processing equipment subsequently receiving the continuous strip formed from the two welded strips.

At the conclusion of the welding operation the welding head 22 is left in the position which it has reached, with the welding current turned off and the fluid in the traversing cylinder 122 locked in the cylinder to hold the welding head stationary. Pressure in the clamping rams 85—88 is released and the welding clamps 20 and 21 spring open. Pressure in the cylinder 68 is released so that the pinch roll housing 28 is drawn toward housing 16 away from fixed stop 70 as spring 61 expands until the tie rod collar 56 engages the abutment 57. The cylinder 63 is then supplied with fluid under pressure to move the pinch roll housings 16 and 28 back to their initial position until return movement of housing 28 is stopped by the spacer 71 engaging the lower extension 55 of the pinch roll housing 28. Additional fluid is supplied to cylinder 63 to continue the return movement of housing 16 against the action of spring 61 until nut 59 engages cup 53. During the return movement of the housings 16 and 28 all of the pinch rolls 14, 15, 26 and 27 are preferably separated to prevent pulling the continuous strip toward the delivery end of the apparatus 10. After completion of the return movement of housing 16 the fluid in the cylinder 63 is locked therein to hold the roll housings 16 and 28 in position for the next operation, and regular movement of strip through the apparatus 10 is resumed until another section of strip is to be added.

While I have illustrated and described a present preferred embodiment of the invention and certain present preferred methods of practicing the same it will be recognized that the invention is not limited thereto but may be otherwise variously embodied within the scope of the following claims.

I claim:

1. The method of making a continuous length of steel strip from a plurality of end-to-end strips comprising the steps of trimming the ends of a pair of steel strips, overlapping the trimmed ends by not more than one thirty-second of an inch, clamping the strip ends close to and on both sides of the whole length of the overlap, and passing welding current through the overlapped ends progressively across the width of the clamped strips while simultaneously rolling down the welded joint as it fuses flush with the adjacent unwelded strip ends.

2. The method of making a continuous length of steel strip from a plurality of end-to-end strips comprising the steps of trimming the ends of a pair of steel strips, overlapping the trimmed ends between one thirty-second and one sixty-fourth of an inch, clamping the strip ends close to and on both sides of the whole length of the overlap, and passing welding current through the overlapped ends progressively across the width of the clamped strips while simultaneously rolling down the welded joint as it fuses flush with the adjacent unwelded strip ends.

3. The method of making a continuous length of steel strip from a plurality of end-to-end strips at least some of which vary in thickness transversely across the strip, comprising the steps of trimming the ends of a pair of steel strips, overlapping the trimmed ends between one thirty-second and one sixty-fourth of an inch, clamping the strip ends close to and on both sides of the whole length of the overlap, and passing welding current through the overlapped ends progressively across the width of the clamped strips while simultaneously yieldably applying a constant pressure and rolling down each portion of the welded joint as it fuses flush with the adjacent unwelded portions of the strip ends, whereby each portion of the overlapped strip ends is welded substantially flush with the adjacent unwelded portions of the strips regardless of variation of thickness of the overlapped strip ends transversely across the strips.

4. The method of making a continuous length of steel strip from a plurality of end-to-end strips, comprising the steps of overlapping the adjacent ends of a pair of steel strips arranged end to end and shearing said overlapping ends simultaneously, removing the trimmings, moving the trimmed ends vertically relative to each other into different horizontal planes and then horizontally toward each other into an initial predetermined overlapping relation not exceeding one thirty-second of an inch, and thereafter moving the strips laterally with the trimmed ends in said initial overlapping relation until the leading end of the trailing strip reaches its position for welding and then stopping the trailing strip and continuing the lateral movement of the leading strip until its trailing end has reached its welding position, the difference in travel of the strips after the initial overlap being less than the initial overlap so that the final overlap of the trimmed ends in welding position is reduced to a small predetermined amount of overlap, clamping the strip ends adjacent and along both sides of the reduced overlap, and while clamped progressively pressure-rolling and simultaneously passing welding current through the overlapped ends across the width of the strips to form a welded joint flush with the adjacent unwelded strip ends.

5. Apparatus for making a continuous length of metal strip from a plurality of end-to-end strips, comprising a shearing unit for trimming strip ends, a strip welding unit comprising a pair of welding wheels on a carriage with means pressing the wheels together as they are moved by the carriage along a pair of slightly overlapping strip ends to mash-weld them together, a pair of elements adapted to clamp strips and disposed with the shearing and welding units in line therebetween, said elements being mounted for lateral movement in the direction of said line for moving trimmed strip ends from the shearing unit to the welding unit, means between the shearing and welding units for supporting the trimmed strip ends during such movement, power means connected to one of said elements to move it in one direction, power means connected to one of said elements to move it in the opposite direction, a connection including a resilient link between said elements, stop means differentially limiting lateral movement of said elements in the direction from the welding unit to the shearing unit so that the element nearest the welding unit is stopped first and the other element travels a predetermined greater distance against the action of said resilient link, and stop means differentially limiting opposite lateral movement of said elements so that the element nearest the shearing unit is stopped first and the other element travels a predetermined greater distance which is less than the first-mentioned greater distance, whereby after the elements are first moved against the first-mentioned stop means and are then clamped on a pair of trimmed ends in the shearing unit, the resilient link automatically causes an initial overlap of the trimmed ends before lateral movement of both ends to the welding unit begins, and the second-mentioned stops automatically reduce the overlap to a predetermined small amount when the trimmed ends reach the welding unit.

6. Apparatus for making a continuous length of metal strip from a plurality of end-to-end strips, comprising a shearing unit for trimming strip ends, a strip welding unit, a pair of elements adapted to clamp strips and disposed with the shearing and welding units in line therebetween, said elements being mounted for lateral movement in the direction of said line for moving trimmed strip ends from the shearing unit to the welding unit, means between the shearing and welding units for supporting the trimmed strip ends during such movement, power means connected to one of said elements to move it in one direction, power means connected to one of said elements to move it in the opposite direction, a connection including a resilient link between said elements, stop means differentially limiting lateral movement of said elements in the direction from the welding unit to the shearing unit so that the element nearest the welding unit is stopped first and the other element travels a predetermined grater distance against the action of said resilient link, and stop means differentially limiting opposite lateral movement of said elements so that the element nearest the shearing unit is stopped first and the other element travels a predetermined greater distance which is less than the first-mentioned greater distance, whereby after the elments ar first moved against the first-mentioned stop means and are then clamped on a pair of trimmed ends in the shearing unit, the resilient link automatically causes an initial overlap of the trimmed ends before lateral movement of both ends to the welding unit begins, and the second-mentioned stops automatically reduce the overlap to a predetermined small amount when the trimmed ends reach the welding unit.

7. Apparatus according to claim 6 wherein the shearing unit comprises cutters for simultaneously trimming two overlapping strip ends, and supports for the respective ends at different levels on opposite sides of the cutters, thereby positioning the trimmed ends to be overlapped in the shearing unit before being moved to the welding unit.

8. Apparatus for making a continuous length of metal strip from a plurality of end-to-end strips, comprising two pairs of pinch rolls, a shearing unit and a welding unit spaced therefrom along the pass line between the two pairs of rolls, rotary braking means and independent rotary driving means for each pair of rolls, a housing for each pair of rolls laterally movable along the pass line through the two pairs of rolls, whereby the rolls are rotatable to position the adjacent ends of two strips in end-to-end relation for trimming in the shearing unit, and are laterally movable while locked against rotation to position the trimmed ends in the welding unit, and means to separate each pair of rolls so that the welded strip is undisturbed while the roll housings are moved laterally back to their initial position.

9. Apparatus for making a continuous length of metal strip from a plurality of end-to-end strips, comprising two pairs of pinch rolls, a shearing unit and a welding unit spaced therefrom along the pass line between the two pairs of rolls, rotary braking means and independent rotary driving means for each pair of rolls, a housing for each pair of rolls laterally movable along the pass line through the two pairs of rolls, whereby the rolls are rotatable to position the adjacent ends of two strips in end-to-end relation for trimming in the shearing unit, and are laterally movable while locked against rotation to position the trimmed ends in the welding unit, stops limiting movement of the respective housings in both directions along the pass line, said stops causing relative movement of the housings at the end of the travel of the housings in both directions in order to impart a predetermined overlap to trimmed strip ends positioned in the welding unit, and means to separate each pair of rolls during at least the final portion of the return movement of the housings so that relative movement of the housings at the end of their return movement will not disturb the welded strip.

10. Apparatus for making a continuous length of metal strip from a plurality of end-to-end strips at least some of which vary in thickness transversely across the strip, comprising means to hold a pair of such strip ends in slightly overlapping relation, a pair of welding wheels substantially wider than the overlap of the strip ends whereby to project over the cooler portion of the strip on each side of the overlap, an electric circuit connected to the welding wheels to pass welding current therebetween, a carriage movable transversely of the strips parallel to the transverse edges of their overlapped ends and mounting the wheels for movement relative to each other and for rolling along opposite sides of said overlapped strip ends, and means yieldably biasing the wheels together with force sufficient to mash down the successive portions of the overlapped ends being fused by the welding current whereby the welding wheels follow the contour of the overlapped strip ends to make a substantially smooth flush weld at each portion of the overlapped ends regardless of variation of thickness of the strip ends transversely across the strips.

11. Apparatus for making a continuous length of metal strip from a plurality of end-to-end strips at least some of which vary in thickness transversely across the strip, comprising means to move a pair of such strip ends into position to be welded in slightly overlapping relation, clamps engageable across each strip closely adjacent the overlapping ends, a pair of welding wheels substantially wider than the overlap of the strip ends whereby to project over the cooler portion of the strip on each side of the overlap, an electric circuit connected to the welding wheels to pass welding current therebetween, a carriage movable transversely of the strips parallel to the transverse edges of their overlapped ends and mounting the wheels for movement relative to each other and for rolling along opposite sides of said overlapped strip ends, and means yieldably biasing the wheels together with force sufficient to mash down the successive portions of the overlapped ends being fused by the welding current whereby the welding wheels follow the contour of the overlapped strip ends to make a substantially smooth flush weld at each portion of the overlapped ends, regardless of variation of thickness of the strip ends transversely across the strips.

12. Apparatus according to claim 11 in which the welding wheels each have a contacting tread width of about one-quarter inch, and the force applied to the wheels by the biasing means is about 800 pounds.

13. Apparatus for making a continuous length of metal strip from a plurality of end-to-end strips at least some of which vary in thickness transversely across the strip, comprising means to hold a pair of such strip ends in slightly overlapping relation, a pair of welding wheels substantially wider than the overlap of the strip ends whereby to project over the cooler portion of the strip on each side of the overlap, an electric circuit connected to the welding wheels to pass welding current therebetween, a carriage movable transversely of the strips parallel to the transverse edges of their overlapped ends, means on the carriage mounting the wheels for relative movement of their axes to vary their spacing and for rolling along opposite sides of said overlapped portions, adjustable means rigidly limiting the minimum spacing of the wheels, and a weight yieldably biasing the wheels together with force sufficient to mash down the successive portions of the overlapped ends being fused by the welding current whereby the welding wheels follow the contour of the overlapped strip ends to make a substantially smooth flush weld at each portion of the overlapped ends regardless of variation of thickness of the strip ends transversely across the strips.

14. Apparatus for making a continuous length of metal strip from a plurality of end-to-end strips movable in a fixed pass line through the apparatus, comprising a pair of pinch rolls, a shearing unit, a welding unit and a second pair of pinch rolls spaced from each other along the pass line in said order, rotary braking means and independent rotary driving means and a housing for each of said pair of pinch rolls, means mounting each said housing for movement along the pass line relative to the shear and welding units, means controlling the spacing between said housings during their said movement along the pass line, and means operable to shift said housings along the pass line, whereby the pinch rolls are rotatable to move the trailing end of one strip and the leading end of the following strip into the shearing unit, and the pinch roll housings are shiftable along the pass line while the pinch rolls are locked against rotation to carry the trimmed ends from the shearing unit to the welding unit and to positon them for welding in the welding unit.

LORENZ IVERSEN.

References Cited in the file of this patent

UNITED STATES PATENTS

| Number | Name | Date |
| --- | --- | --- |
| 1,226,639 | Cary | May 22, 1917 |
| 1,230,114 | Cary | June 19, 1917 |
| 1,276,030 | Cary | Aug. 20, 1918 |
| 1,511,849 | Taylor | Oct. 14, 1924 |
| 1,865,530 | Lutz | July 5, 1932 |
| 1,936,314 | Sykes | Nov. 21, 1933 |
| 2,016,380 | Lutz | Oct. 8, 1935 |
| 2,024,597 | Pfeiffer | Dec. 17, 1935 |
| 2,078,365 | Biggert | Apr. 27, 1937 |
| 2,203,151 | Iverson | June 4, 1940 |
| 2,343,687 | Martindell | Mar. 7, 1944 |
| 2,362,388 | MacChesney | Nov. 7, 1944 |
| 2,369,830 | Johnson | Feb. 20, 1945 |
| 2,412,648 | Rendell | Dec. 17, 1946 |